(12) United States Patent
Heck

(10) Patent No.: US 9,370,830 B2
(45) Date of Patent: Jun. 21, 2016

(54) MILLING TOOL AND METHOD OF USING SAME

(71) Applicant: Philip Heck, Highland, MI (US)

(72) Inventor: Philip Heck, Highland, MI (US)

( * ) Notice: Subject to any disclaimer, the term of this patent is extended or adjusted under 35 U.S.C. 154(b) by 153 days.

(21) Appl. No.: 14/209,124

(22) Filed: Mar. 13, 2014

(65) Prior Publication Data

US 2014/0271013 A1   Sep. 18, 2014

Related U.S. Application Data

(60) Provisional application No. 61/790,624, filed on Mar. 15, 2013.

(51) Int. Cl.
*B23C 3/12*   (2006.01)

(52) U.S. Cl.
CPC . *B23C 3/12* (2013.01); *B23C 3/126* (2013.01); *B23C 2220/20* (2013.01); *B23C 2220/40* (2013.01); *B23C 2240/16* (2013.01); *Y10T 409/303808* (2015.01); *Y10T 409/304256* (2015.01)

(58) Field of Classification Search
CPC ............ B23C 3/12; B23C 3/126; B23C 5/08; B27C 5/10
USPC ............. 30/500; 144/104, 108, 97–99, 251.1, 144/251.2, 251.3
See application file for complete search history.

(56) References Cited

U.S. PATENT DOCUMENTS

| | | | | |
|---|---|---|---|---|
| 2,431,581 A | * | 11/1947 | Owen | B23C 5/006 29/893.35 |
| 2,705,513 A | * | 4/1955 | Moeller | B27F 5/12 144/136.1 |
| 2,729,038 A | * | 1/1956 | Hutchins | B24B 5/006 279/33 |
| 2,898,957 A | * | 8/1959 | Demarkis | B27C 5/10 144/136.1 |
| 4,574,532 A | * | 3/1986 | Haberle | B24B 55/052 144/251.2 |
| 5,026,221 A | * | 6/1991 | Arai | B23Q 11/08 144/251.2 |
| 5,423,642 A | | 6/1995 | Heck | |

(Continued)

FOREIGN PATENT DOCUMENTS

| | | | | |
|---|---|---|---|---|
| CH | 300669 A | * | 8/1954 | ............ B27C 5/10 |
| CH | 479377 A | * | 10/1969 | ............ B23C 3/126 |
| DE | 1907372 A1 | * | 8/1970 | ............ B27C 5/10 |

*Primary Examiner* — Sunil K Singh
*Assistant Examiner* — Ryan Rufo
(74) *Attorney, Agent, or Firm* — Carrier Blackman & Associates, P.C.; William D. Blackman; Jingli Wang

(57) ABSTRACT

A milling tool for use with a rotary drive mechanism. The tool includes a cylindrical torque transmission shaft, a cylindrical sleeve which receives the torque transmission shaft therein, and a hood for attaching to the sleeve member, where the torque transmission shaft is rotatably supported in the sleeve. The tool also includes a hood having a cylindrical body portion, a transverse flange and a C-shaped collar attached to and extending outwardly from an outer edge of the flange. The tool also includes a fence which is adjustably attached to the hood, and a cutting wheel including a rotatable disc and a plurality of cutting bits respectively mounted on the disc. The cutting wheel is disposed inside the collar and proximate the fence, and is affixed to an end of the torque transmission shaft for concurrent rotation therewith. Methods of using the milling tool for machining weld seams are also described.

14 Claims, 14 Drawing Sheets

(56) References Cited

U.S. PATENT DOCUMENTS

| | | | |
|---|---|---|---|
| 5,637,035 A * | 6/1997 | Yee | B23Q 11/08 144/251.2 |
| 6,042,311 A | 3/2000 | Yokoyama et al. | |
| 6,264,408 B1 * | 7/2001 | Lung | B23B 49/008 279/157 |
| 6,450,741 B1 | 9/2002 | Cannelli, Jr. | |
| 6,678,960 B2 * | 1/2004 | Williams | B27B 9/02 30/373 |
| 7,070,371 B2 | 7/2006 | Choi | |
| 7,077,736 B2 * | 7/2006 | Uzumcu | B23D 47/126 451/358 |
| 7,140,816 B2 | 11/2006 | Hall | |
| 7,251,874 B2 | 8/2007 | Stoeger | |
| 7,310,879 B1 * | 12/2007 | Clarke | B23D 45/16 30/122 |
| 7,596,872 B2 * | 10/2009 | Clarke | B23D 45/16 30/388 |
| 8,468,918 B2 * | 6/2013 | Kadosh et al. | B23C 5/08 407/113 |
| 2005/0126357 A1 * | 6/2005 | Brunton | B23D 59/02 83/22 |
| 2005/0139288 A1 * | 6/2005 | Mair | B27C 1/005 144/371 |

* cited by examiner

MILLING TOOL AND METHOD OF USING SAME

CROSS-REFERENCE TO RELATED APPLICATIONS

The present application claims priority under 35 U.S.C. 119(e), based on U.S. provisional application 61/790,624, filed 15 Mar. 2013. The entire disclosure of this priority document, including specification, claims, and drawings, is incorporated by reference herein.

BACKGROUND OF THE INVENTION

1. Field of the Invention

The present invention relates to a milling tool which is usable with a rotary drive mechanism, and to methods of using the tool to trim and machine weld joints on welded metal workpieces. More particularly, the present invention relates to a milling tool which is usable to flatten weld beads of welded butt joints on a flat plate, which is also usable to trim weld beads from fillet welds on inside angle plates, and the invention also relates to methods of using the tool.

2. Description of the Background Art

A number of different tools are known for grinding and milling. Examples of some of the known tools include those described in U.S. Pat. Nos. 5,423,642, 6,042,311, 6,450,741, 7,070,371, 7,140,816 and 7,251,874.

Although the known grinding and milling tools are useful for their intended purposes, a need still exists in the art for an improved milling tool. In particular, there is a need for an improved milling tool which is usable to machine inner weld beads of 90 degree fillet welds on inside angle plates, and for methods of using such a tool.

SUMMARY OF THE INVENTION

Accordingly, it is an object of the present invention to provide a method and machine usable for machining an inner weld bead of a 90 degree fillet weld on a welded assembly of two angle plates oriented transverse to one another.

It is another object of the present invention to provide a method and machine usable for machining a weld bead of a butt joint on a flat plate formed from two parallel pieces of plate stock.

It is yet another object of the present invention to provide methods of machining welded seams on metal workpieces.

In a first embodiment of the invention, a milling tool is configured for use with a rotary drive mechanism. The tool includes a cylindrical torque transmission shaft, a sleeve which receives the torque transmission shaft therein, and a hood for attaching to the sleeve member, where the torque transmission shaft is rotatably supported in the sleeve.

The milling tool also includes a hood having a cylindrical body portion, a transverse flange and a C-shaped collar attached to and extending outwardly from an outer edge of the flange. The milling tool also includes a fence which is adjustably attached to the hood, and a cutting wheel including a rotatable disc and a plurality of cutting bits respectively mounted on the disc. The cutting wheel is disposed inside the collar and proximate the fence, and is attached to an end of the torque transmission shaft for concurrent rotation therewith.

Another embodiment of the present invention provides a method of trimming a weld seam from a fillet weld on a welded assembly formed from two perpendicular angle plates.

The method includes a step of aligning a fence of a rotary milling tool with a vertical angle plate of the welded assembly, with a hood of the milling tool placed facing downwardly on a horizontal angle plate of the weld assembly.

The method also includes a step of powering the milling tool to rotate a cutting wheel thereof; and includes another step of slidably moving the milling tool along the weld seam while keeping the fence in contact with the vertical angle plate, and simultaneously keeping the hood in contact with the horizontal angle plate.

The tool is also usable to trim a weld bead from a butt joint on a flat plate formed from two parallel pieces of plate stock, or alternatively, may be used to remove heavily built-up paint from a flat surface.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures and methodology needed for illustrating selected embodiments of the present invention are described herein. Other conventional structures, and those of ancillary and auxiliary components of the system, will be known and understood by those in the art.

Figure 1:
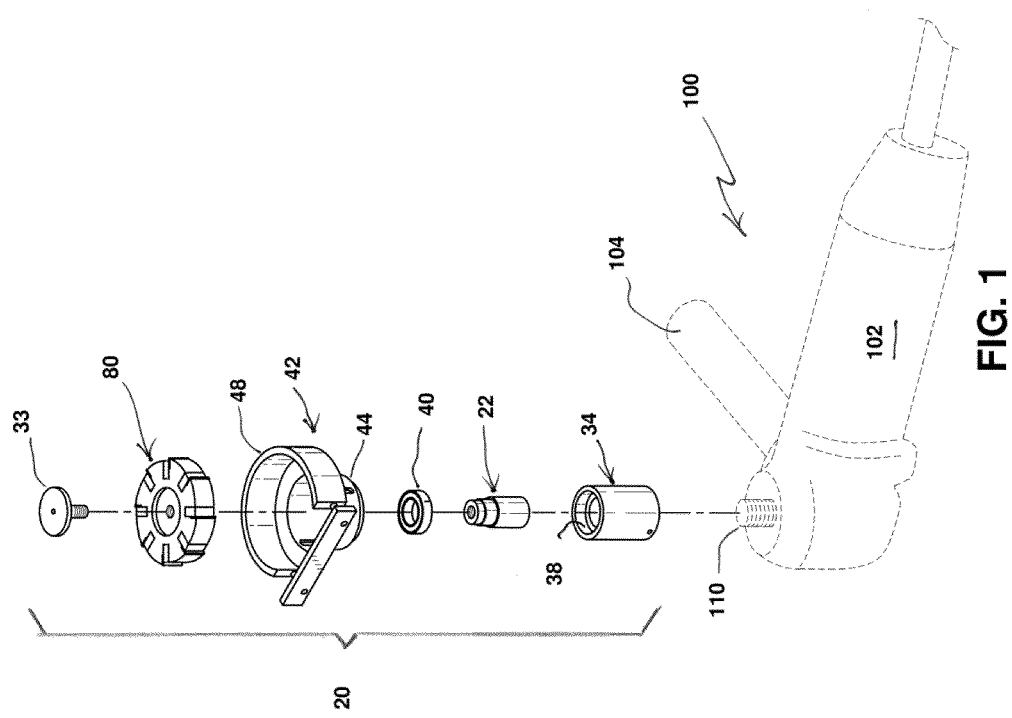
FIG. 1 is an exploded perspective view of a milling tool according to an illustrative embodiment of the present invention, with a rotary drive mechanism shown in phantom.
Figure 2:
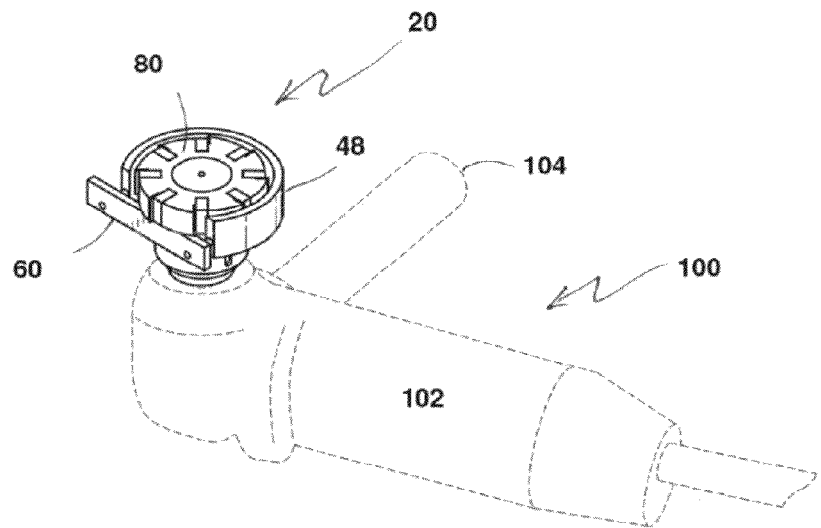
FIG. 2 is an assembled perspective view of the milling tool and rotary drive mechanism of FIG. 1.

Referring now to the drawings, FIG. 1 is an exploded perspective view of a milling tool 20 according to an illustrative embodiment of the present invention, with a rotary drive mechanism 100 shown in phantom. The milling tool 20 hereof is configured for use with a known, rotary drive mechanism 100. FIG. 2 is an assembled perspective view of the milling tool and rotary drive mechanism of FIG. 1.

Throughout the following description, the term "proximal" will be used to refer to parts of the tool 20 which are situated relatively close to the rotary drive mechanism 100 in an assembled operational configuration as shown in FIG. 2, and the term "distal" will be used to refer to parts of the tool 20 which are situated further away from the rotary drive mechanism 100 than corresponding proximal parts.

Figure 11:
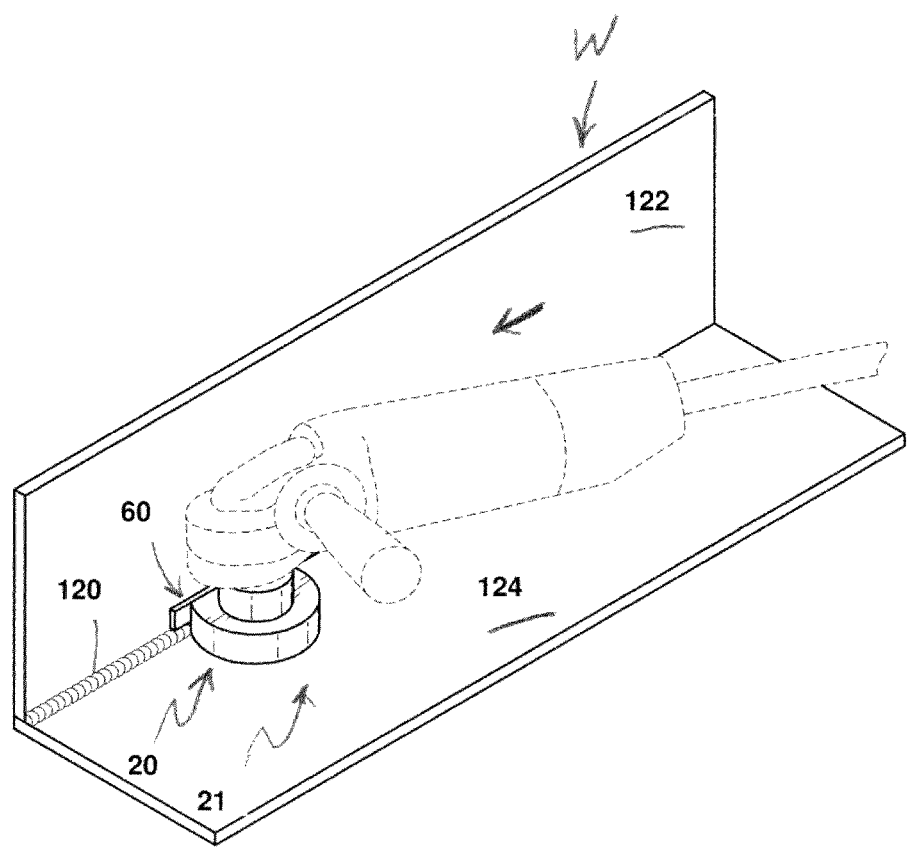
FIG. 11 is an environmental view showing the tool in use to remove a weld seam from a 90 degree fillet weld on a welded assembly formed from two inside angle plates.
Figure 12:
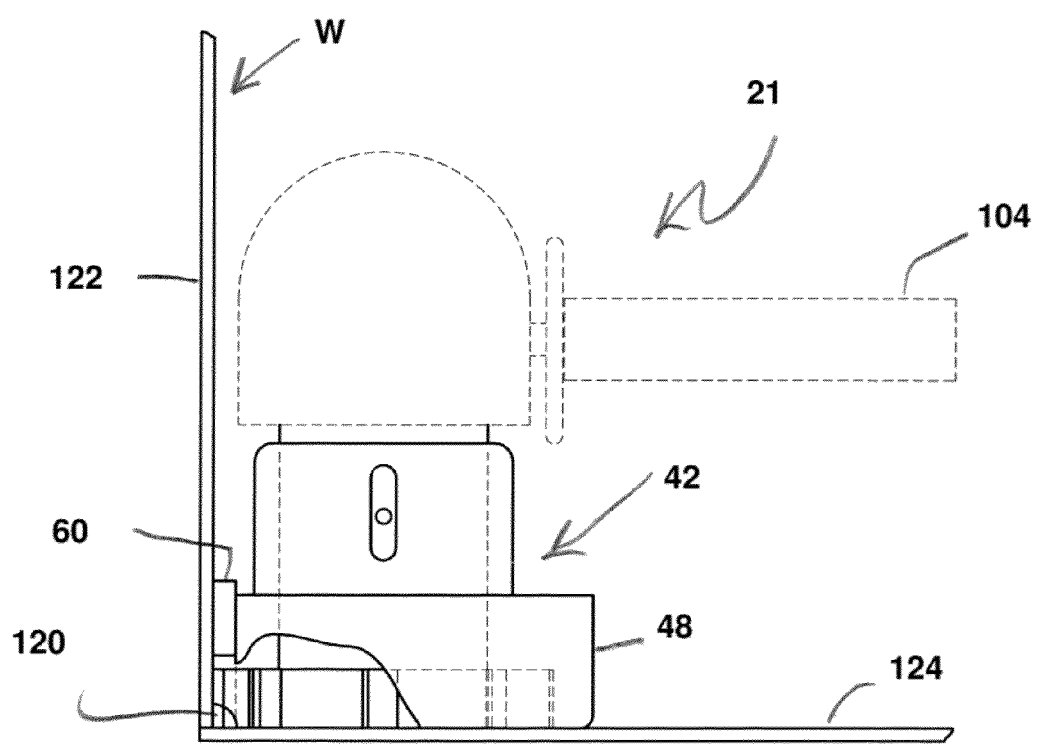
FIG. 12 is a side plan view of the tool and welded angle plate assembly of FIG. 5.

As noted above, the milling tool 20 hereof is configured for use with a known, commercially available rotary drive mechanism 100, which may be either electrically or pneumatically actuated. The rotary drive mechanism 100 having the tool 50 mounted thereon as shown in FIGS. 2, 11 and 12 is referred to herein, in combination, as a milling machine 21. The rotary drive mechanism 100 includes a graspable main body portion 102, and a side handle 104 extending transversely outwardly from the main body portion. The rotary drive mechanism 100 further includes a rotatable threaded drive shaft 110 extending outwardly at an end thereof, in a direction transverse to a longitudinal axis of the main body portion 102.

Figure 3:
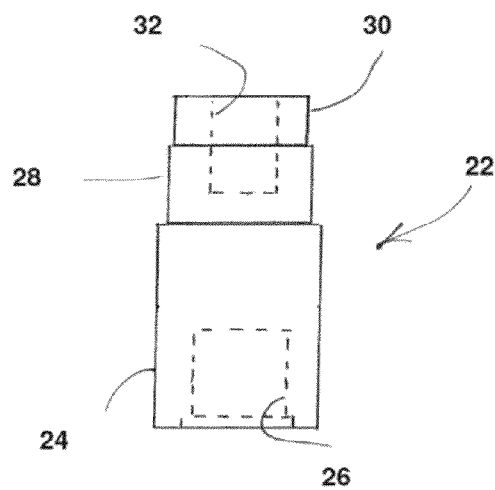
FIG. 3 is a side plan view of a torque transmission shaft which is a component part of the tool of FIGS. 1-2.

As seen in FIGS. 1 and 3, the milling tool 20 includes a cylindrical torque transmission shaft 22 with a first (proximal) end 24 having a first threaded bore 26 formed therein, for receiving the threaded drive shaft 110 of the rotary drive mechanism 100. The torque transmission shaft 22 also has a midsection 28 configured to support a bearing 40 thereon, and a second (distal) end 30, which is reduced in diameter as compared to the midsection 28, and which is configured for supporting a cutting wheel 80 thereon. The second (distal) end 30 of the torque transmission shaft 22 has a second threaded bore 32 formed therein for receiving a threaded shaft 33s of a fastener 33, where the fastener is used to attach the cutting wheel 80 to the torque transmission shaft 22.

Figure 4:
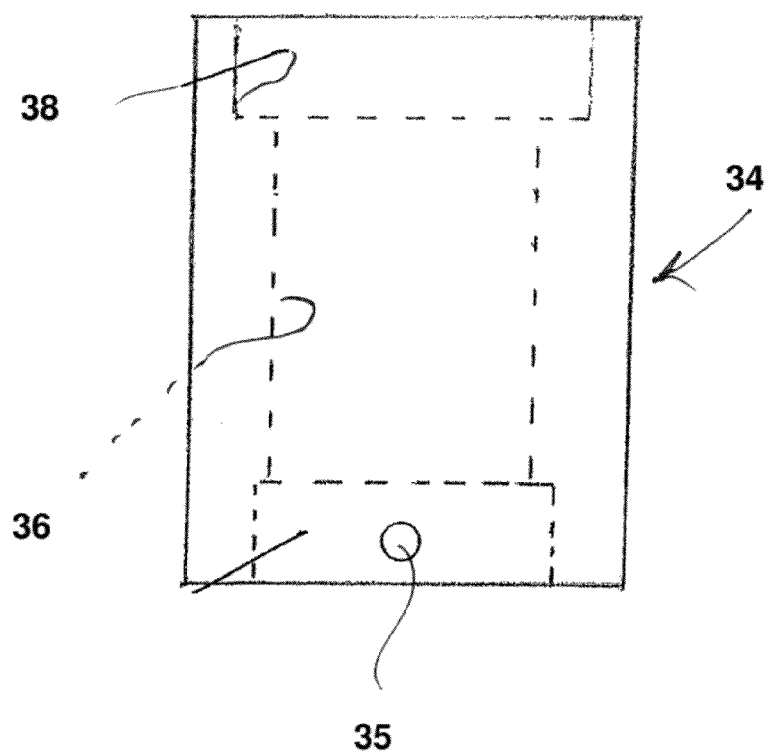
FIG. 4 is a side plan view of a sleeve which is another component part of the tool of FIGS. 1-2.
Figure 5B:
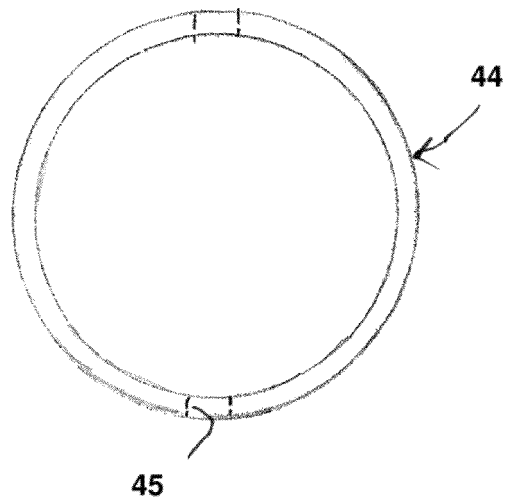
FIG. 5B is a tip plan view of the hood of FIG. 5A.
Figure 5A:
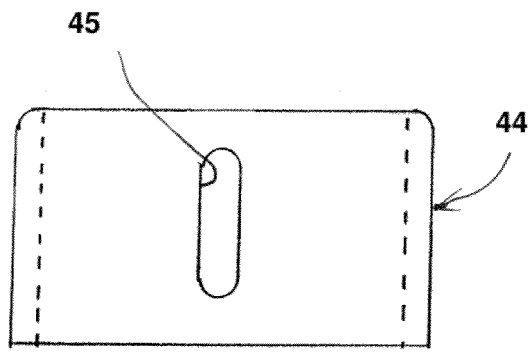
FIG. 5A is a side plan view of a cylindrical body portion of a hood, which is another component part of the tool of FIGS. 1-2.
Figure 5C:
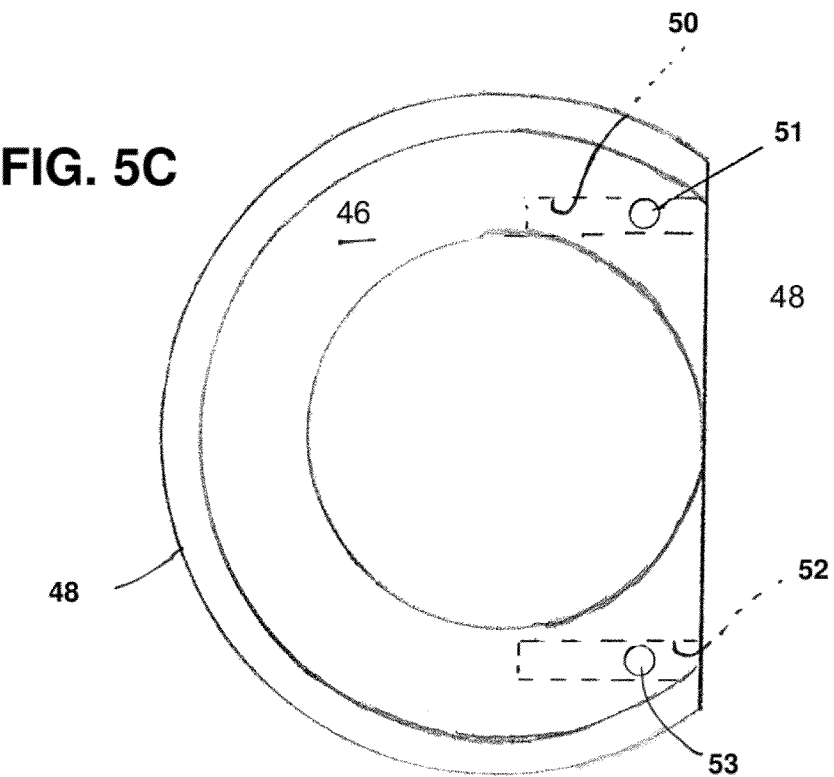
FIG. 5C is a top plan view of another part of the hood including a flange and collar.
Figure 5D:
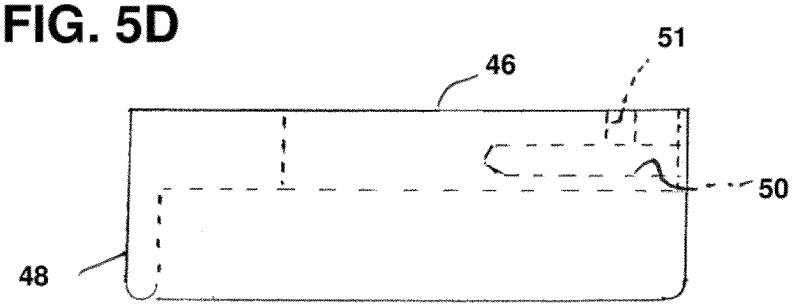
FIG. 5D is a side plan view of the flange and collar of FIG. 5C.
Figure 8A:
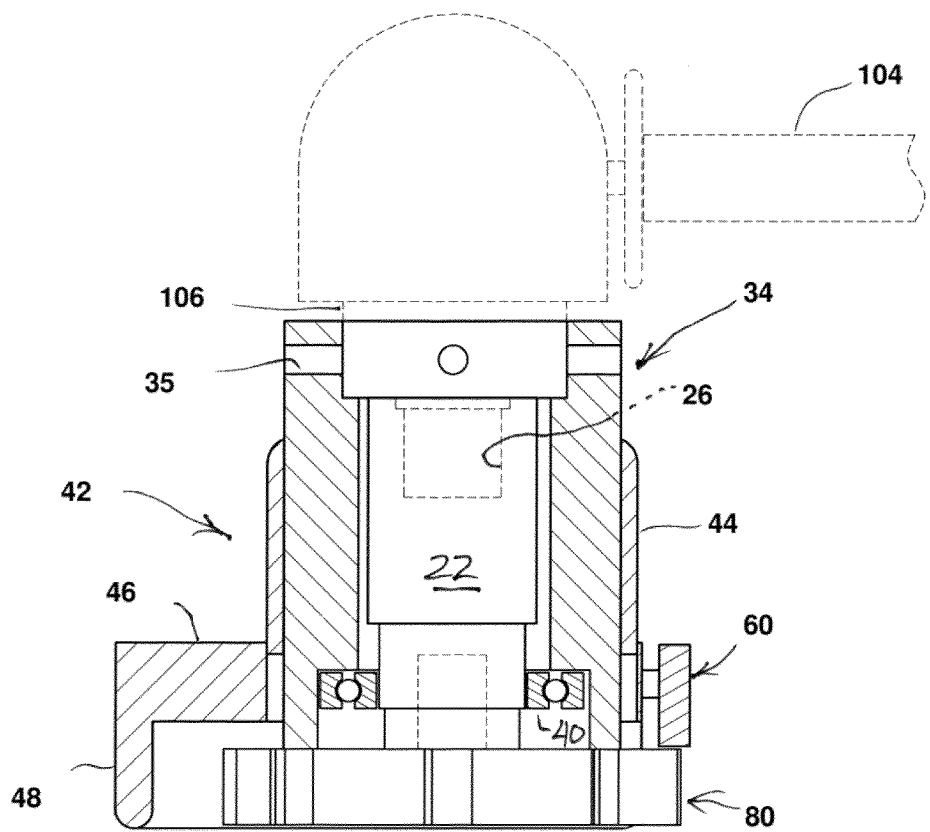
FIG. 8A is a cross-sectional view through the tool of FIGS. 1-2.
Figure 8B:
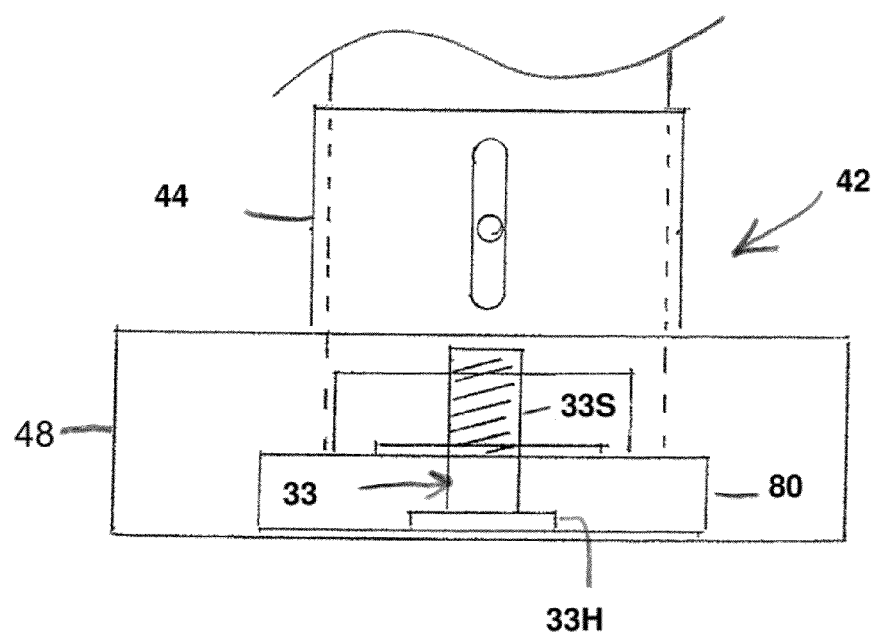
FIG. 8B is a detail side plan view, partially cut away, showing selected internal structural components of the tool.

As seen in FIGS. 1 and 4, the milling tool 20 also includes a cylindrical sleeve member 34, which rotatably receives the torque transmission shaft 22 therein. The sleeve member 34 is attachable to a flange 106 (FIG. 8A) or other suitable non-rotating part of the rotary drive mechanism 100. The sleeve member 34 is provided for attaching non-moving parts of the tool 20 to the rotary drive mechanism, and does not rotate relative to the main body portion 102 of the drive mechanism 100. The sleeve member 34 may have one or more apertures 35 formed therein to receive appropriate fasteners 37, for use in attaching the sleeve member to the rotary drive mechanism 100.

The sleeve member 34 has a hollow bore 36 formed therethrough for receiving the torque transmission shaft 22, and also has an enlarged diameter seat 38 formed in a distal end thereof to receive the bearing 40, which fits into the seat and is interposed between the torque transmission shaft 22 and the sleeve member 34, to facilitate rotation of the torque transmission shaft relative to the sleeve member.

As seen in FIGS. 1 and 5A-5D, the milling tool 20 also includes a hood 42 for adjustably attaching to the sleeve member 34. The hood 42 houses the cutting wheel 80 therein, and includes a cylindrical body portion 44, a flange 46 extending radially outwardly from an end of the cylindrical body portion, and a substantially C-shaped collar 48 attached to and extending distally outwardly from the flange 46, in a direction opposite to the body portion 44.

Optionally, if desired, the flange 46 and collar 48 may be formed together as a separate member from the cylindrical body portion 44, as illustrated in FIGS. 5A-5D.

The cylindrical body portion 44 of the hood 42 has a pair of opposed guide slots 45 formed therein, as shown, to permit adjustment of the hood 42 in relation to the sleeve 34.

Figure 9:
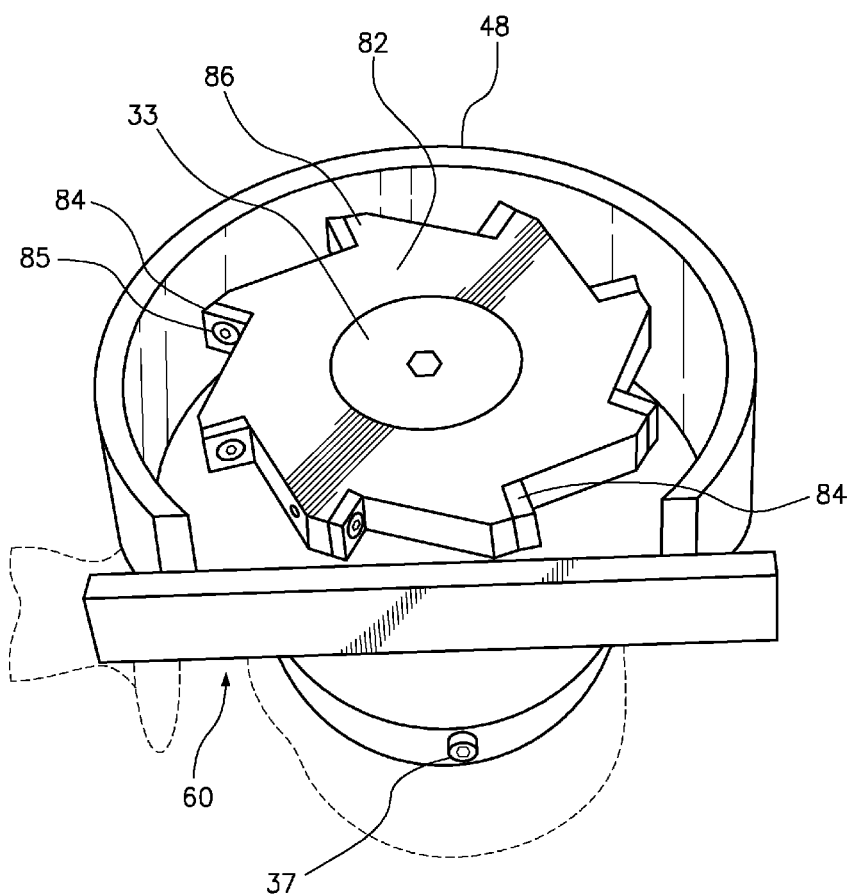
FIG. 9 is a perspective view of the tool showing a modified embodiment of a cutting wheel thereon.

One side of the flange 46 is cut away to define a flattened edge portion 47, in order to allow the cutting wheel 80 to extend outwardly past the hood 42, as shown in FIGS. 2, 9 and 12.

The flange 46 is formed of relatively thick metal, as shown, in order to allow a pair of parallel blind bores 50, 52 to be drilled therein in order to receive and accommodate a pair of parallel support posts 54, 56 of a fence 60 (FIGS. 6A-6C), as will be further described herein. The flange 46 may also have a pair of access apertures 51, 53 formed therein in communication with the respective corresponding blind bores 50, 52 to receive Allen screws or similar fasteners (not shown), in order to allow a user to temporarily and adjustably fix the position of the fence 60 in relation to the hood 42.

Figure 6C:
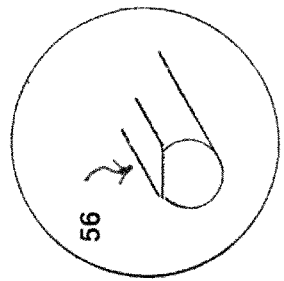
FIG. 6C is a detail perspective view of a mounting post which is a portion of the fence of FIGS. 6A-6B.
Figure 6B:
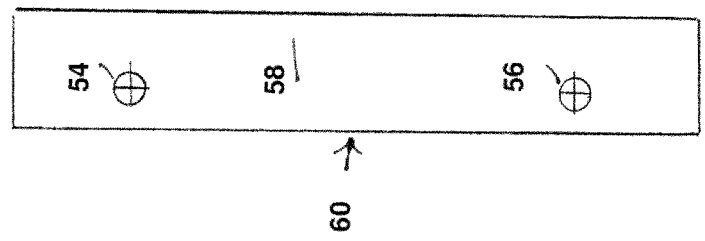
FIG. 6B is a side plan view of the fence of FIG. 6A.
Figure 6A:
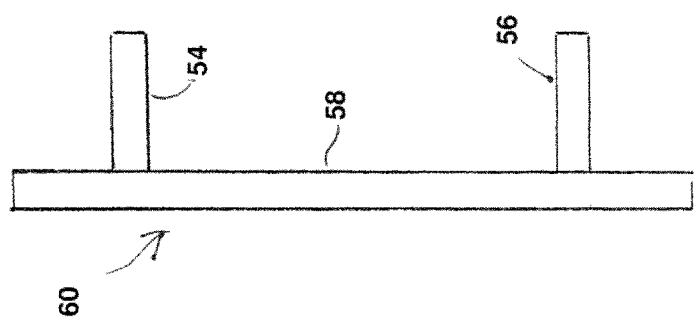
FIG. 6A is a top plan view of a fence, which is another component part of the tool.
Figure 7:
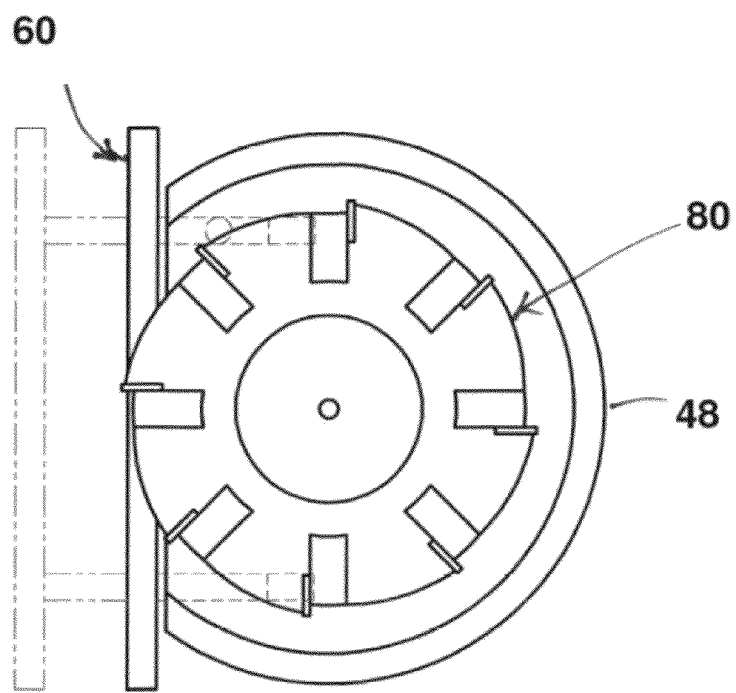
FIG. 7 is a top plan detail view of the tool of FIGS. 1-2, with an extended position of the fence shown in phantom.

As seen in FIGS. 7 and 9, the fence 60 is adjustably attached to the hood 42 at the flat edge portion 47 thereof. The fence 60 is selectively slidably positionable on the hood 42, as shown in FIG. 7. The fence 60 includes a panel portion 58 and a pair of integrally formed parallel support posts 54, 56 configured to slidably fit into the blind bores 51, 52 of the flange. Optionally, each of the parallel support posts 54, 56 may be formed with a flattened surface thereon, as shown in the insert of FIG. 6C, in order to provide an optimized contact surface for position-fixing fasteners (not shown) disposed in the access apertures 51, 53, in order to permit the position of the fence 60 to be fixed in relation to the hood 42.

Figure 10A:
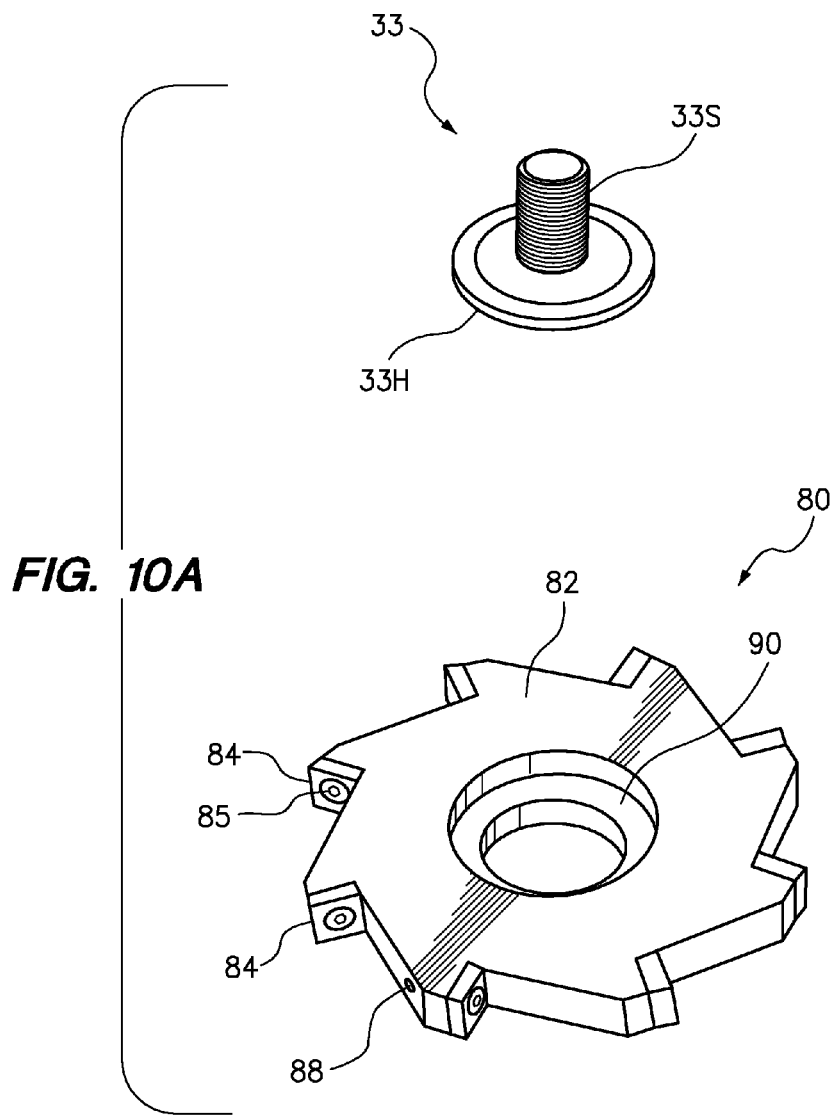
FIG. 10A is a perspective view of the cutting blade and associated fastener shown removed from the tool of FIG. 9.
Figure 10B:
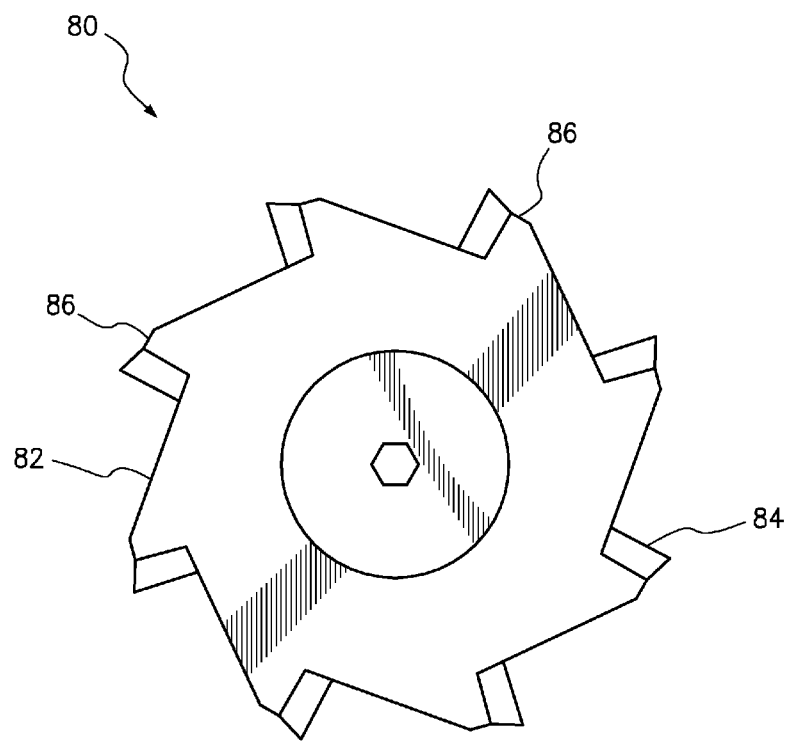
FIG. 10B is a plan view of the cutting blade and fastener of FIG. 10A, shown in an assembled configuration.

As previously mentioned, the milling tool 20 also includes the cutting wheel 80, including a rotatable disc 82 and a plurality of cutting bits 84 respectively mounted on the disc. Each of the cutting bits 84 may have a stepped cylindrical mounting hole formed therein to receive a head portion of a fastener 85 seated therein, and the disc 82 may be configured as shown in FIGS. 9-10B to include a plurality of outwardly extending teeth 86, with each of the teeth having a threaded bore 88 formed therein to receive a shaft portion of a fastener 85, to permit attachment of the cutting bits 84 to the disc 82. The disc 82 has a hollow bore formed centrally therein to receive the distal end 30 of the torque transmission shaft 22 therein, and the bore may also have a keyway formed therein, as shown, to receive a key to fix the position of the disc 82 on the transmission shaft to ensure concurrent rotation thereof. The disc 82 may also have a stepped seat 90 formed in an outer surface thereof to receive a head portion 33H of the fastener 33, in order to provide a flush surface.

The cutting wheel 80 is attached to the second (distal) end of the torque transmission shaft 22 for concurrent rotation therewith. The cutting wheel 80 is disposed inside the collar 48 of the hood, and is proximate the fence 60, with one part of the wheel extending outwardly beyond the flat edge portion 47 of the flange 46. The cutting bits 84 may be made of tungsten carbide or other highly abrasive material.

Method of Use

As shown in FIGS. 11-12, the present invention also encompasses a method of trimming a weld seam 120 from a fillet weld on a welded assembly or workpiece W, formed from two inside angle plates 122, 124.

The method includes a first step of aligning a fence 60 of a rotary milling tool 20 with a vertical angle plate 122 of the welded assembly W with a hood 42 of the milling tool placed facing downwardly on a horizontal angle plate 124 of the welded assembly.

The method also includes a step of powering the milling tool 20 to rotate a cutting wheel 80 thereof.

The method also includes a step of slidably moving the milling tool 20 along the weld seam 120 (in the direction of the arrow in FIG. 11) while keeping the fence 60 in contact with the vertical angle plate 122, and keeping the hood 42 in contact with the horizontal angle plate 124.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

I claim:

1. A milling tool configured for use with a rotary driver, said milling tool comprising:
    a cylindrical torque transmission shaft having a threaded bore formed in a first end thereof for attaching to a threaded shaft of said rotary driver, and having a second end for supporting a cutting wheel thereon, said torque transmission shaft being rotatable about a central axis thereof;
    a hood surrounding the torque transmission shaft, said hood comprising:
        a cylindrical body portion which is substantially coaxial with the torque transmission shaft,
        a flange extending radially outwardly from an end of said cylindrical body portion,
        and a substantially C-shaped collar attached to and extending outwardly from the flange in a direction substantially opposite to the body portion;
    a fence member which is adjustably attached to said hood and which is selectively slidably positionable thereon in a direction substantially transverse to the axis of the torque transmisision shaft;
    a cutting wheel comprising a rotatable disc and a plurality of cutting bits respectively mounted on the disc, the cutting wheel attached to the second end of the torque transmission shaft for concurrent rotation therewith, the cutting wheel being disposed inside the collar of the hood, and proximate the fence; and
    a cylindrical sleeve which receives the torque transmission shaft therein,
    wherein the torque transmission shaft is rotatably supported in the sleeve.

2. The milling tool of claim 1, further comprising a bearing interposed between the sleeve and the torque transmission shaft.

3. The milling tool of claim 2, wherein the sleeve has an annular seat formed therein, wherein the second end of the torque transmission shaft has a reduced diameter stepped portion thereon, and wherein the bearing is disposed in the seat between the sleeve and the torque transmission shaft.

4. The milling tool of claim 1, wherein the hood is slidably adjustable in relation to the sleeve in an axial direction of the torque transmission shaft.

5. The milling tool of claim 1, wherein the cutting wheel has a stepped seat formed in an outer surface thereof to receive a head portion of a fastener.

6. The milling tool of claim 1, wherein the flange comprises a flattened portion and the cutting wheel extends outwardly beyond the flattened portion.

7. The milling tool of claim 1, wherein each of the cutting bits has a stepped cylindrical mounting hole formed therein to receive a head of a fastener therein, and wherein the disc of the cutting wheel comprises a plurality of outwardly extending teeth, with each of the teeth having a threaded bore formed therein to receive a shaft portion of a fastener to permit removable attachment of the respective cutting bits to the disc.

8. A milling tool configured for use with a rotary driver, said milling tool comprising:
    a cylindrical torque transmission shaft having a threaded bore formed in a first end thereof for attaching to a threaded shaft of said rotary driver, and having a second end for supporting a cutting wheel thereon;
    a cylindrical sleeve which slidably receives the torque transmission shaft therein, wherein the torque transmission shaft is rotatably supported in the sleeve;
    a hood for attaching to the sleeve member, said hood comprising a cylindrical body portion, a flange extending radially outwardly from an end of said cylindrical body portion, and a substantially C-shaped collar attached to and extending outwardly from the flange in a direction opposite to the body portion;
    a fence which is adjustably attached to said hood and which is selectively slidably positionable thereon;
    a cutting wheel comprising a rotatable disc and a plurality of cutting bits respectively mounted on the disc, the cutting wheel attached to the second end of the torque transmission shaft for concurrent rotation therewith, wherein the cutting wheel is disposed inside the collar of the hood, and proximate the fence.

9. The milling tool of claim 8, further comprising a bearing interposed between the sleeve and the torque transmission shaft.

10. The milling tool of claim 9, wherein the sleeve has an annular seat formed therein, wherein the second end of the torque transmission shaft has a reduced diameter stepped portion thereon, and wherein the bearing is disposed in the seat between the sleeve and the torque transmission shaft.

11. The milling tool of claim 8, wherein the hood is slidably adjustable in relation to the sleeve in an axial direction of the torque transmission shaft.

12. The milling tool of claim 8, wherein the cutting wheel has a stepped seat formed in an outer surface thereof to receive a head portion of a fastener.

13. The milling tool of claim 8, wherein the flange comprises a flattened portion and the cutting wheel extends outwardly beyond the flattened portion.

14. The milling tool of claim 8, wherein each of the cutting bits has a stepped cylindrical mounting hole formed therein to receive a head of a fastener therein, and wherein the disc of the cutting wheel comprises a plurality of outwardly extending teeth, with each of the teeth having a threaded bore formed therein to receive a shaft portion of a fastener to permit removable attachment of the respective cutting bits to the disc.

* * * * *